(12) United States Patent
Nakanishi et al.

(10) Patent No.: US 12,071,715 B2
(45) Date of Patent: Aug. 27, 2024

(54) YARN AND METHOD OF PRODUCING THE SAME

(71) Applicant: SUNLINE CO., LTD., Iwakuni (JP)

(72) Inventors: Takumi Nakanishi, Iwakuni (JP); Keita Suizu, Iwakuni (JP); Takashi Ogawa, Iwakuni (JP)

(73) Assignee: SUNLINE CO., LTD., Iwakuni (JP)

( * ) Notice: Subject to any disclaimer, the term of this patent is extended or adjusted under 35 U.S.C. 154(b) by 0 days.

(21) Appl. No.: 18/213,369

(22) Filed: Jun. 23, 2023

(65) Prior Publication Data

US 2023/0416953 A1 Dec. 28, 2023

(30) Foreign Application Priority Data

Jun. 24, 2022 (JP) ................. 2022-102174

(51) Int. Cl.
| | |
|---|---|
| *D02G 3/36* | (2006.01) |
| *A01K 91/00* | (2006.01) |
| *D02G 3/04* | (2006.01) |
| *D02G 3/44* | (2006.01) |

(52) U.S. Cl.
CPC ............ *D02G 3/36* (2013.01); *D02G 3/045* (2013.01); *D02G 3/44* (2013.01); *A01K 91/00* (2013.01); *D10B 2321/042* (2013.01); *D10B 2331/02* (2013.01); *D10B 2401/063* (2013.01); *D10B 2507/00* (2013.01)

(58) Field of Classification Search
CPC . D02G 3/045; D02G 3/36; D02G 3/44; A01K 91/00; D01F 8/00; D01F 8/12
See application file for complete search history.

(56) References Cited

U.S. PATENT DOCUMENTS

2010/0046896 A1* 2/2010 Mahapatra ............ G02B 6/443
385/100

FOREIGN PATENT DOCUMENTS

| JP | 2005-76158 A | 3/2005 |
|---|---|---|
| JP | 2009-219360 A | 10/2009 |
| JP | 2009254245 A * | 11/2009 |
| JP | 2021-70898 A | 5/2021 |
| JP | 2022034119 A * | 3/2022 |

\* cited by examiner

*Primary Examiner* — Shaun R Hurley
(74) *Attorney, Agent, or Firm* — Birch, Stewart, Kolasch & Birch, LLP (57) ABSTRACT

An object of the present invention is to provide a yarn having a core-sheath structure, in which yarn the delamination between the core and the sheath can be inhibited, and a method of producing the same. Present invention provides a yarn having a core-sheath structure including a core composed of a polyamide and a sheath composed of a fluororesin, wherein the fluororesin constituting the sheath contains an adhesive functional group and has a melting point of from 220 to 250° C.

7 Claims, 6 Drawing Sheets

YARN AND METHOD OF PRODUCING THE SAME

CROSS-REFERENCE TO RELATED APPLICATION

This non-provisional application claims the benefit under 35 U.S.C. § 119(a) to Patent Application No. 2022-102174, filed in Japan on Jun. 24, 2022, which is hereby expressly incorporated by reference into the present application.

TECHNICAL FIELD

The present invention relates to a yarn, particularly, a yarn to be used as a fishing line or the like, and a method of producing the same.

BACKGROUND ART

As a material of a yarn, particularly, as a material of a fishing line, a polyamide resin such as Nylon, a fluororesin such as polyvinylidene fluoride, a polyester resin such as polyethylene terephthalate or a polyolefin resin such as polyethylene has been used. Since fishing lines are required to have properties such as strength, flexibility, wear resistance and water resistance, and some of these properties are in conflict with resin properties, yarns composed of the respective resins described above coexist in the market, and users have been selecting material resins from the above-described resins, depending on the properties they place importance on.

To obtain a yarn which has each of the above-described properties at a high level, a yarn has been devised which is obtained by blending two or more kinds of the resins described above, or obtained by blending any of the above resins with a fluororesin or the like. However, such a yarn obtained by blending resins showed a significant decrease in strength, and also had a problem in compatibility, resulting in a failure to achieve a sufficient improvement in the properties.

A composite spinning method is known as one of the spinning methods. The composite spinning method enables to produce a yarn having a core-sheath structure composed of different resins. In fishing line applications, however, there are cases where a yarn having a core-sheath structure which has been produced by the composite spinning method fails to provide a good adhesion between the resin constituting the core and the resin constituting the sheath, depending on the types of the resins used, possibly leading to the occurrence of delamination between the core and the sheath. Further, there are also cases where the difference between the thermal expansion coefficient of the resin constituting the core and the thermal expansion coefficient of the resin constituting the sheath leads to the occurrence of delamination between the core and the sheath.

SUMMARY OF THE INVENTION

Problems to be Solved by the Invention

The present invention advantageously solves the above-mentioned problems, and an object of the present invention is to provide a yarn having a core-sheath structure, in which yarn the delamination between the core and the sheath can be inhibited, and a method of producing the same.

Means for Solving the Problems

As a result of intensive studies to develop a yarn that combines strength, flexibility, wear resistance, water resistance and the like, the present inventors have found out that a yarn having a core-sheath structure which is composed of a core made of a polyamide and a sheath made of a fluororesin containing an adhesive functional group and having a melting point of from 220 to 250° C., has strength, flexibility and wear resistance as well as a low water absorbency, and thus has excellent properties as a yarn, particularly, as a fishing line. The present inventors have also found out that the delamination between the core and the sheath can be inhibited in the above-described yarn. The inventors have thus arrived at the present invention.

Specifically, the present invention is the following [1] to [5].

[1] A yarn having a core-sheath structure including a core composed of a polyamide and a sheath composed of a fluororesin, wherein the fluororesin constituting the sheath contains an adhesive functional group and has a melting point of from 220 to 250° C.

[2] The yarn according to [1], wherein the fluororesin is an ethylene-tetrafluoroethylene copolymer.

[3] A yarn which is a twisted yarn or a braided yarn containing a plurality of the yarns according to [1] as original yarns.

[4] The yarn according to any one of [1] to [3], which is a fishing line.

[5] A method of producing a yarn having a core-sheath structure including a core composed of a polyamide and a sheath composed of a fluororesin by a composite spinning method, wherein the fluororesin constituting the sheath contains an adhesive functional group and has a melting point of from 220 to 250° C.

Effects of the Invention

The yarn according to the present invention enables to inhibit the delamination between the core and the sheath in a yarn having a core-sheath structure.

The method of producing a yarn according to the present invention enables to produce a yarn having a core-sheath structure, in which yarn the delamination between the core and the sheath is inhibited.

MODE FOR CARRYING OUT THE INVENTION

The yarn according to the present invention and the method of producing the same will now be specifically described.

Figure 1:
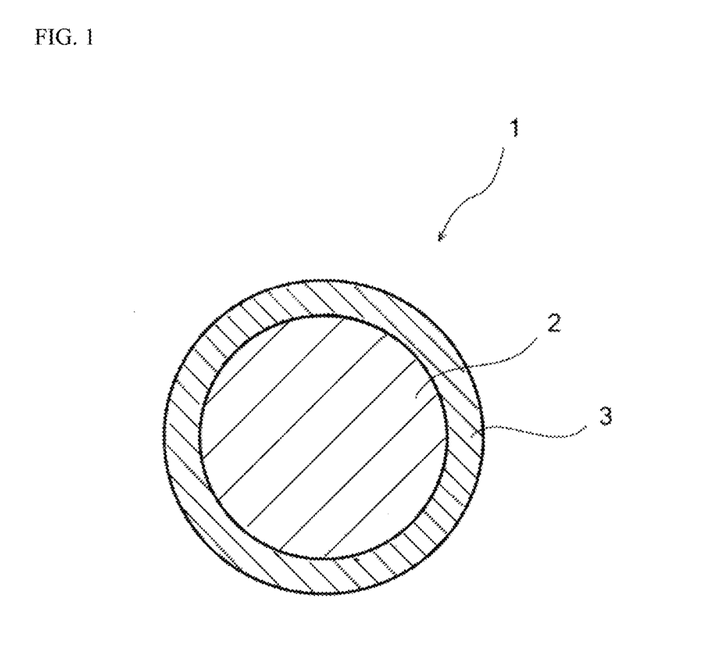
FIG. 1 is a schematic cross-sectional view of a yarn according to one embodiment of the present invention.
Figure 2:
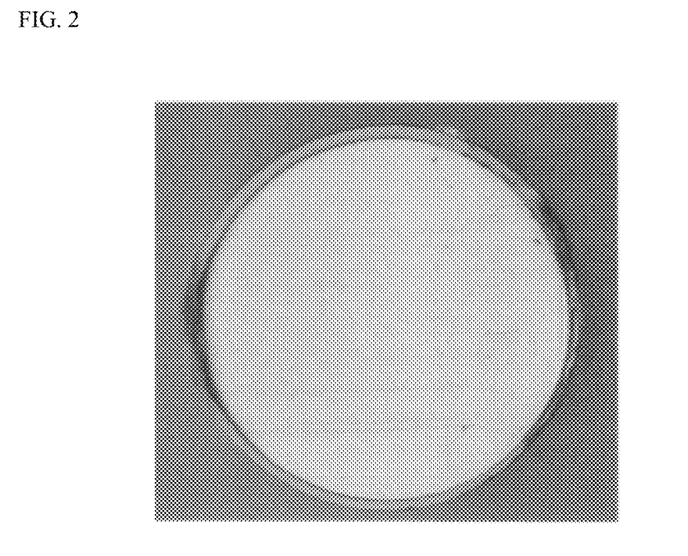
FIG. 2 is a photograph showing a cross section of a yarn according to another embodiment of the present invention.

The yarn according to the present invention has a core-sheath structure including a core composed of a polyamide and a sheath composed of a fluororesin, and the fluororesin constituting the sheath contains an adhesive functional group and has a melting point of from 220 to 250° C. FIG. 1 shows a schematic cross-sectional view of the yarn according to the present invention. In FIG. 1, a yarn 1 includes a core 2 and a sheath 3. FIG. 2 shows a microscopic photograph of one example of a cross section of the yarn according to the present invention. It can be seen from FIG. 1 and FIG. 2 that the yarn according to the present invention has a core-sheath structure.

By allowing the yarn to have a core-sheath structure and using a polyamide as the material of the core, the yarn according to the present invention has a high strength, wear resistance and flexibility of a polyamide, also as a yarn. Further, while the high water absorbency of the polyamide makes it disadvantageous for use as a fishing line, a specific fluororesin is used as the material of the sheath in the present invention. This specific fluororesin has a remarkably low water absorbency. Thus, it is possible to produce a yarn having a low water absorbency, by forming the sheath of the yarn which comes into contact with moisture, such as water or sea water, during the use of the yarn, with the specific fluororesin. Therefore, the yarn according to the present invention not only has strength, flexibility and wear resistance but also has a low water absorbency, and thus has excellent properties as a fishing line, by allowing the yarn to have a core-sheath structure composed of a core made of a polyamide and a sheath made of a fluororesin.

However, in a common yarn having a core-sheath structure, there is a risk that delamination may occur between the resin constituting the core and the resin constituting sheath. To solve such a problem, a resin containing an adhesive functional group is used as the fluororesin, in the yarn according to the present invention. By using a fluororesin containing an adhesive functional group as the resin constituting the sheath, it is possible to improve the adhesion to the polyamide constituting the core, and to inhibit the delamination.

In addition, the fluororesin constituting the sheath of the yarn according to the present invention has a melting point of from 220 to 250° C. In the findings so far, it has been considered that a resin having a melting point which is as much closer as possible to the melting point of the resin constituting the core is preferred as the fluororesin to be used for the sheath. Specifically, it has been thought that, when the core is made of a polyamide, a fluororesin having a melting point of about 200° C. is preferred as the fluororesin to be used for the sheath. However, the studies by the present inventors have revealed that a fluororesin having a melting point of from 220 to 250° C. is particularly preferred as the fluororesin constituting the sheath. The reason for this is not necessarily clear. However, it is thought that, when the fluororesin constituting the sheath has a melting point of from 220 to 250° C., it is possible to inhibit the delamination due to the difference in thermal expansion coefficient between the polyamide and the fluororesin, and to ensure the stretchability as a fishing line.

Examples of the polyamide constituting the core include PA6, PA12, PA6/66 and PA6/12. A pigment, a dye and/or a performance-enhancing additive can be added to the polyamide, as an additive(s).

The fluororesin constituting the sheath is a fluororesin containing an adhesive functional group, and is preferably an ethylene-tetrafluoroethylene copolymer (ETFE) which contains an adhesive functional group. Examples of the adhesive functional group include carbonyl group, carbonate group, carboxy group, haloformyl groups, alkoxycarbonyl groups and acid anhydride groups.

The fluororesin constituting the sheath has a melting point of from 220 to 250° C. When the fluororesin has a melting point within the range of from 220 to 250° C., the delamination between the polyamide core can be favorably inhibited. The melting point of the fluororesin is preferably from 225 to 240° C., and more preferably higher than 230° C. and 240° C. or lower.

Examples of the above-described fluororesin containing an adhesive functional group and having a melting point of from 220 to 250° C. include AH-2000 and AH-5000 (brand names), manufactured by AGC Chemicals Company.

The fluororesin constituting the sheath preferably has a contact angle with water of 100 degrees or more, and this allows for producing a yarn having a high water repellency.

The ratio (polyamide)/(fluororesin) of the polyamide constituting the core to the fluororesin constituting the sheath is preferably from (60/40) to (90/10) in volume ratio. A volume ratio of less than (60/40) leads to a disadvantage that delamination could possibly occur. A volume ratio of more than (90/10) is not preferred from the viewpoint of stabilizing the formability of the sheath. The volume ratio is more preferably within the range of from (70/30) to (80/20).

To produce the yarn according to the present invention, a molten polyamide on the central side and a molten fluororesin on the peripheral side are co-extruded through spinnerets arranged concentrically in a composite spinning machine, by a composite spinning method, to obtain a yarn having a core-sheath structure.

The spinning is preferably carried out at a spinning temperature of from 285 to 330° C. A spinning temperature of 285° C. or higher enables to exhibit an excellent adhesion at the interface between the core and the sheath, and a spinning temperature higher than 330° C. leads to a risk of the occurrence of carbonization.

The monofilament after spinning is cooled, and then stretched. The cooling distance is preferably from 40 to 100 mm, and a cooling distance of 40 mm or more leads to a better adhesion. Further, the stretching magnification can be set within the range of from 4 to 6 times.

The surface of the sheath of the monofilament can be coated with silicone, a surfactant, or the like.

The yarn according to the present invention can be used in the form of a monofilament. The monofilament preferably has a diameter of from 0.05 to 3.5 mm, and more preferably has a diameter of from 0.1 to 1 mm. Further, the shape of a transverse cross section of the monofilament is not particularly limited but is usually circular. The transverse cross-sectional shape of the monofilament can be any known irregular shape other than a circular shape, to the extent that the shape does not cause any trouble during use as a fishing line, such as, for example, the occurrence of accumulated twist or the susceptibility to curling.

The yarn according to the present invention preferably has a tensile strength of from 7 to 10 cN/dTex, and the elongation at the tensile strength is preferably from 23 to 35%. Further, the yarn according to the present invention preferably has a knot strength of from 4 to 9 cN/dTex, and the elongation at the knot strength is preferably from 10 to 20%.

Further, the yarn according to the present invention can be used not only in the form of a monofilament, but also as a twisted yarn or a braided yarn composed of a plurality of filaments.

The yarn according to the present invention has a high strength, wear resistance and flexibility as a yarn, and also has a low water absorbency. Accordingly, the yarn is suitable as a fishing line. However, the application of the yarn according to the present invention is not limited to a fishing line. The yarn according to the present invention can also be used in other applications in which a high strength, wear resistance or flexibility, or a low water absorbency is required.

EXAMPLES

The present invention will now be described specifically with reference to Examples.

The yarns of Examples 1 and 2 as well as Comparative Examples 1 to 5 as shown in Table 1 were prepared.

Example 1: A Yarn Composed of a Core Made of PA6/66 (Brand Name: 5033TX12; Manufactured by UBE Corporation) and a Sheath Made of ETFE (Brand Name: AH-5000, Melting Point: 225° C.; Manufactured by AGC Chemicals Company)

The yarn of Example 1 was produced by extrusion molding with the spinning temperature of a composite spinning machine set to 285° C., followed by stretching at a stretching magnification of 5.7 times.

The yarn of Example 2 was produced in the same manner as in Example 1, except that the core-sheath ratio was changed from that used in Example 1.

Comparative Example 1: A Yarn Composed of a Core Made of PA6/66 (Brand Name: 5033TX12; Manufactured by UBE Corporation) and a Sheath Made of ETFE (Brand Name: Fluon® ETFE, Melting Point: 260° C.; Manufactured by AGC Chemicals Company)

The yarn of Comparative Example 1 was produced in the same manner as in Example 2, except that the raw material of the sheath was changed from that used in Example 2.

TABLE 1

| | Core | | Sheath | | Yarn | Linear strength | | | Knot strength | | | 2 h immersion in water Water absorption |
|---|---|---|---|---|---|---|---|---|---|---|---|---|
| | Material | Ratio | Material | Ratio | number | (N) | (g/d) | (%) | (N) | (g/d) | (%) | rate |
| Example 1 | 5033TX12 (PA6/66) | 7 | AH-5000 (ETFE) | 1 | #2.5 | 54.8 | 8.87 | 27 | 28.1 | 4.56 | 12 | 0.8% |
| Example 2 | 5033TX12 (PA6/66) | 8 | AH-5000 (ETFE) | 1 | #2.5 | 53.7 | 9.18 | 27.9 | 26.8 | 4.59 | 11.9 | 0.4% |
| Comparative Example 1 | 5033TX12 (PA6/66) | 8 | ETFE | 1 | #2.5 | 33.9 | 6.08 | 20.9 | 24.9 | 4.46 | 14.8 | 0.5% |
| Comparative Example 2 | 5033TX12 (PA6/66) | 8 | KF1000 (PVDF) | 1 | #2.5 | 51.3 | 8.51 | 30.4 | 34.5 | 5.72 | 14.9 | 0.4% |
| Comparative Example 3 | 5033TX12 (PA6/66) | 8 | 6010/0000 (PVDF) | 1 | #2.5 | 52.9 | 8.28 | 24.3 | 34.8 | 5.45 | 13.5 | 0.3% |
| Comparative Example 4 | TA-6012/0001 (PVDF) | 100 | — | | #2.5 | 43.6 | 5.4 | 25.6 | 27.6 | 3.42 | 14.6 | 0.0% |
| Comparative Example 5 | 5033TX12 (PA6/66) | 100 | — | | #2.5 | 51.7 | 9.62 | 26.2 | 42.9 | 7.99 | 17.2 | 2.8% |

| | 2 h immersion in water Shrinkage rate | 20 minutes immersion in boiling water Shrinkage rate | Wear resistance (times/mm$^2$) | Flexibility (g/mm) | Rate of decrease (*1) | Delamination (*2) | Delamination (*3) |
|---|---|---|---|---|---|---|---|
| Example 1 | 0.9% | 12.2% | 2084 | 13.1 | 25% | Not observed | Not observed |
| Example 2 | 0.3% | 9.8% | 2143 | 10.6 | 20% | Not observed | Not observed |
| Comparative Example 1 | 0.6% | 9.3% | 1849 | 7.8 | 14% | Observed | Observed |
| Comparative Example 2 | 1.2% | 21.1% | 2510 | 11 | 15% | Observed | Observed |
| Comparative Example 3 | 1.4% | 12.7% | 2180 | 15.9 | 15% | Observed | Observed |
| Comparative Example 4 | 0.1% | 6.7% | 1226 | 16.1 | 11% | — | — |
| Comparative Example 5 | 2.0% | 25.0% | 2156 | 13.2 | 38% | — | — |

(*1) The rate of decrease in linear strength after wear (10 times)
(*2) Delamination due to wear
(*3) Delamination due to fracture Comparative Example 2: A Yarn Composed of a Core Made of PA6/66 (Brand Name: 5033TX12, a Nylon 6/66 Copolymer; Manufactured by UBE Corporation) and a Sheath Made of PVDF (Brand Name: KF1000, Melting Point: 173° C.; Manufactured by Kureha Corporation)

The yarn of Comparative Example 2 was produced in the same manner as in Example 2, except that the raw material of the sheath was changed from that used in Example 2.

Comparative Example 3: A Yarn Composed of a Core Made of PA6/66 (Brand Name: 5033TX12, Manufactured by UBE Corporation) and a Sheath Made of PVDF (Brand Name: 6010/0000, Melting Point: 173° C.; Manufactured by 3M Company)

The yarn of Comparative Example 3 was produced in the same manner as in Example 2, except that the raw material of the sheath was changed from that used in Example 2.

Comparative Example 4: A PVDF Monofilament (Brand Name: TA-6012/0001, Melting Point: From 170 to 174° C.; Manufactured by Solvay S.A.) which does not have a Core-Sheath Structure The yarn of Comparative Example 4 was produced by a common spinning machine at a spinning temperature of 270° C.

Comparative Example 5: A PA6/66 Monofilament (Brand Name: 5033TX12; Manufactured by UBE Corporation) which does not have a Core-Sheath Structure The yarn of Comparative Example 5 was produced by a common spinning machine at a spinning temperature of 265° C.

The core-sheath ratio (volume ratio) and the yarn number of each of the yarns of Examples and Comparative Examples are listed together in Table 1.

For each of the yarns of Examples and Comparative Examples, the linear strength, the knot strength, the water absorption rate and the shrinkage rate after being immersed in water for two hours, the shrinkage rate after being immersed in boiling water for 20 minutes, the wear resistance, the flexibility, the rate of decrease in linear strength after wear, the delamination due to wear and the delamination due to fracture were measured, and the results thereof are listed together in Table 1. These tests and the evaluations of the results were carried out as follows.

(1) Linear Strength

Using a TENSILON universal tester manufactured by AND Corporation, a test yarn was set such that the distance between the upper and lower chucks was 25 cm, the lower chuck was moved downward at a rate of 300 mm/min, and the maximum load value and the elongation when the yarn had fractured were measured.

(2) Knot Strength

Using a TENSILON universal tester manufactured by AND Corporation, a single knotted sample yarn was set such that the distance between the upper and lower chucks was 25 cm, the lower chuck was moved downward at a rate of 300 mm/min, and the maximum load value and the elongation when the yarn had fractured were measured.

(3) Water Absorption Rate and Shrinkage Rate after being Immersed in Water for Two Hours A sample yarn which had been cut into a size of 1 m was immersed in a water tank controlled to a temperature of 23° C. for two hours, and then the difference in length (shrinkage rate) and the difference in weight (water absorption rate) with a blank were measured.

(4) Shrinkage Rate after being Immersed in Boiling Water for 20 Minutes

A sample yarn which had been cut into a size of 1 m was immersed in boiling water for 20 minutes, and then the difference in length (shrinkage rate) with a blank was measured.

(5) Wear Resistance

A test yarn was rubbed against a grindstone (#60) which had been set in water while applying a load of 150 g, at a stroke length of 100 mm and at a rate of 56.8 mm/sec, and the number of reciprocations until the yarn had fractured was measured.

(6) Flexibility

Both ends of a sample yarn are fixed such that the sample length is 25 mm, the width thereof is 2 mm, and the yarn is set so as to be in contact with a scale in that state. From the set position, the yarn was allowed to fall 3 mm at a rate of 1.5 mm/sec, and the load applied to the scale was measured (A lower value indicates that the yarn is more flexible).

(7) Rate of Decrease in Linear Strength after Wear

A test yarn was rubbed for 10 reciprocations against a grindstone (#60) which had been set in water while applying a load of 150 g, at a stroke length of 100 mm and at a rate of 56.8 mm/sec. Using a TENSILON universal tester manufactured by AND Corporation, the test yarn was set such that the distance between the upper and lower chucks was 25 cm, the lower chuck was moved downward at a rate of 300 mm/min, and the maximum load value when the yarn had fractured was measured.

(8) Delamination Due to Wear

A test yarn was rubbed against a grindstone (#60) which had been set in water while applying a load of 150 g, at a stroke length of 100 mm and at a rate of 56.8 mm/sec, and the number of reciprocations until the yarn had fractured was counted and the state of the sample after the fracture was observed.

(9) Delamination Due to Fracture

Using a TENSILON universal tester manufactured by AND Corporation, a test yarn was set such that the distance between the upper and lower chucks was 25 cm, the lower chuck was moved downward at a rate of 300 mm/min until the yarn had fractured, and a cross section of the yarn after the fracture was observed.

It can be seen from Table 1 that the yarns of Examples 1 and 2 had about the same degree of knot strength as the yarn of Comparative Example 4 while having about the same degree of linear strength as the yarn of Comparative Example 5, and had a water absorbency as evaluated by immersion in water, which is lower than that of the yarn of Comparative Example 5. In addition, while having a wear resistance and flexibility close to those of the yarn of Comparative Example 5, delamination due to wear and delamination due to fracture did not occur in the yarns of Examples 1 and 2.

Figure 3A:
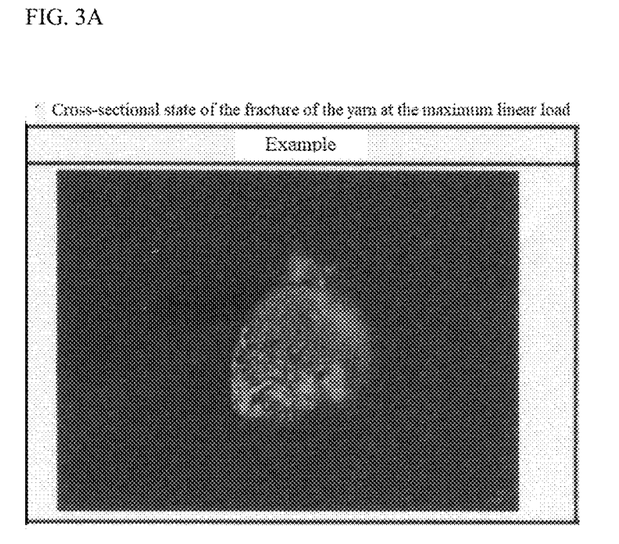
FIG. 3A is a photograph showing a cross-sectional state of a fracture portion of yarn at maximum linear load.
Figure 3B:
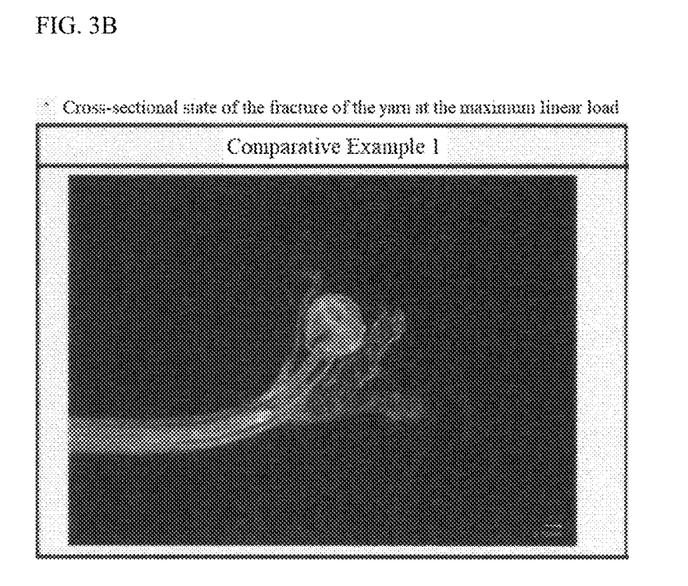
FIG. 3B is a photograph showing a cross-sectional state of a fracture portion of yarn at maximum linear load.
Figure 3C:
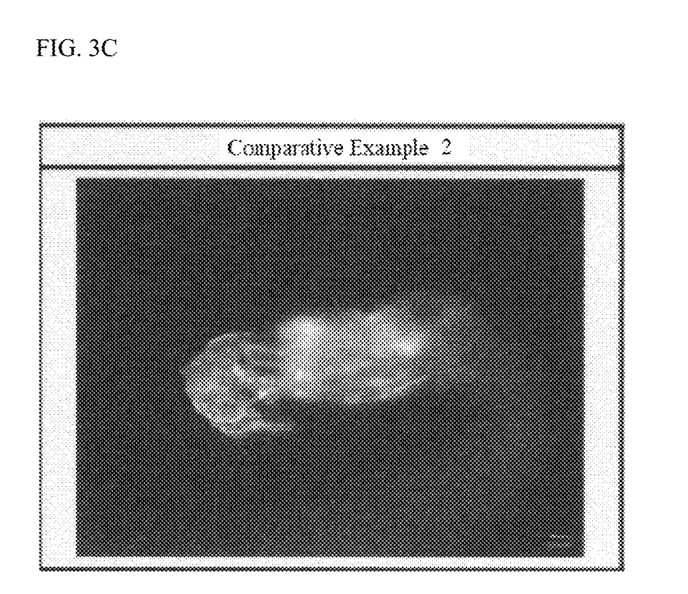
FIG. 3C is a photograph showing a cross-sectional state of a fracture portion of yarn at maximum linear load.
Figure 3D:
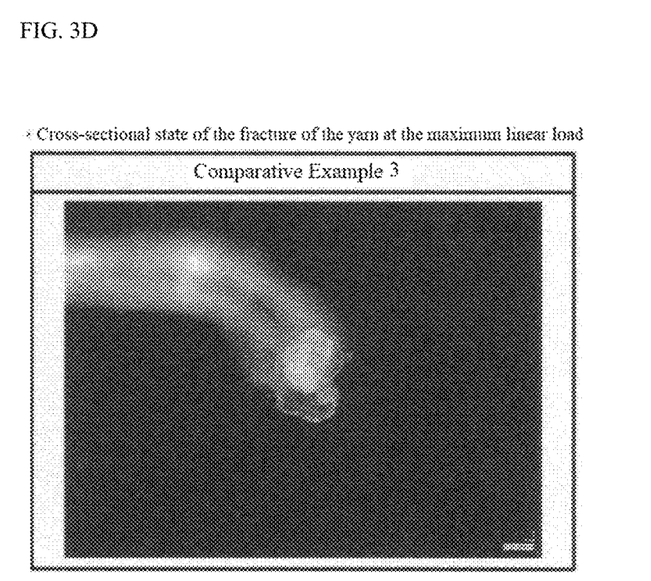
FIG. 3D is a photograph showing a cross-sectional state of a fracture portion of yarn at maximum linear load.

FIG. 3A to FIG. 3D show photographs each illustrating the cross-sectional state of the fracture of the yarn at the maximum linear load, when the linear strength as described above is examined. FIG. 3A shows the yarn of Example 1, FIG. 3B shows the yarn of Comparative Example 1, FIG. 3C shows the yarn of Comparative Example 2, and FIG. 3D shows the yarn of Comparative Example 3. It can be seen from FIG. 3A to FIG. 3D that the delamination between the core and the sheath was not observed in the yarn of Example 1. In contrast, the delamination between the core and the sheath was observed in the yarns of Comparative Examples 1, 2 and 3.

Figure 4A:
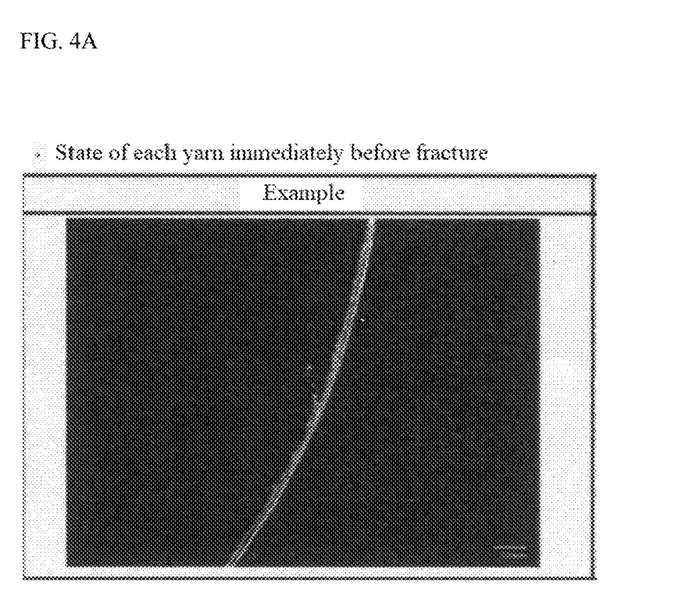
FIG. 4A is a photograph showing a state of yarn immediately before fracture when delamination of the yarn due to wear is examined.
Figure 4B:
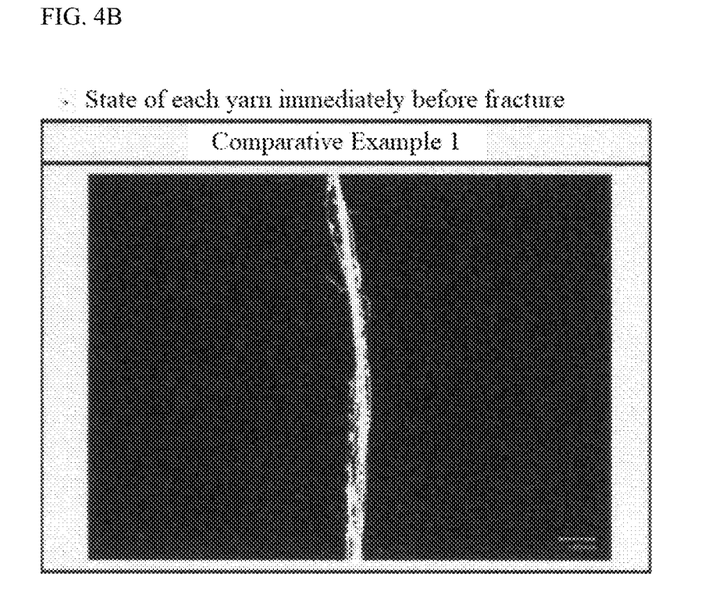
FIG. 4B is a photograph showing a state of yarn immediately before fracture when delamination of the yarn due to wear is examined.
Figure 4C:
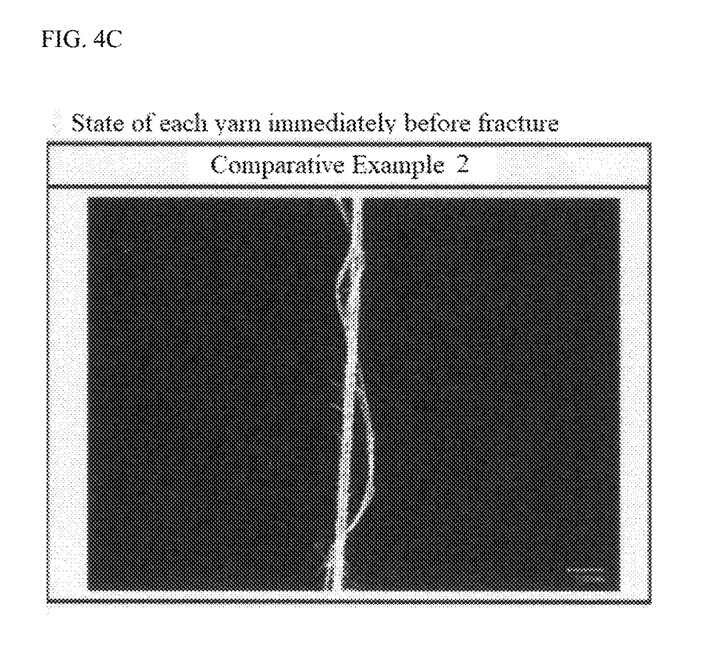
FIG. 4C is a photograph showing a state of yarn immediately before fracture when delamination of the yarn due to wear is examined.
Figure 4D:
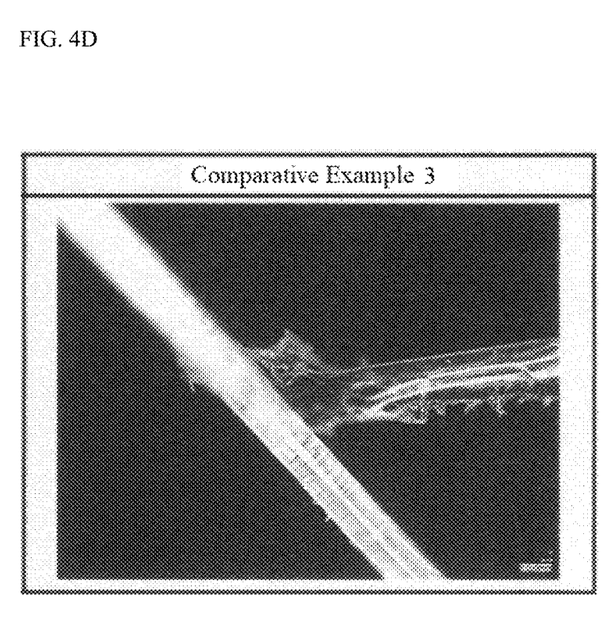
FIG. 4D is a photograph showing a state of yarn immediately before fracture when delamination of the yarn due to wear is examined.

Further, FIG. 4A to FIG. 4D show photographs each illustrating the state of the yarn immediately before fracture, when the delamination due to wear as described above is examined. FIG. 4A shows the yarn of Example 1, FIG. 4B shows the yarn of Comparative Example 1, FIG. 4C shows the yarn of Comparative Example 2, and FIG. 4D shows the yarn of Comparative Example 3. It can be seen from FIG. 4A to FIG. 4D that the delamination between the core and the sheath was barely observed in the yarn of Example 1. In contrast, a marked delamination was observed between the core and the sheath in the yarns of Comparative Examples 1, 2 and 3.

The invention claimed is:

1. A yarn comprising a core-sheath structure including a core composed of a polyamide and a sheath composed of a fluororesin, wherein the fluororesin constituting the sheath contains an adhesive functional group and has a melting point of from 220 to 250° C.

2. The yarn according to claim 1, wherein the fluororesin is an ethylene-tetrafluoroethylene copolymer.

3. The yarn according to claim 2, wherein the yarn is a fishing line.

4. A yarn comprising a twisted yarn or a braided yarn containing a plurality of yarns, each of which is the yarn according to claim 1.

5. The yarn according to claim 1, wherein the yarn is a fishing line.

6. A fishing line comprising a twisted yarn or a braided yarn containing a plurality of yarns, each of which is the yarn according to claim 1.

7. A method of producing a yarn having a core-sheath structure including a core composed of a polyamide and a sheath composed of a fluororesin by a composite spinning method,
wherein the fluororesin constituting the sheath contains an adhesive functional group and has a melting point of from 220 to 250° C.

* * * * *